Patented Sept. 19, 1944

2,358,331

UNITED STATES PATENT OFFICE 2,358,331

PARENTERAL SOLUTIONS OF 9-POLYHY-DROXYALKYL-ISO-ALLOXAZINES

Alfred E. Jurist, Brooklyn, N. Y., assignor to E. R. Squibb & Sons, New York, N. Y., a corporation of New York No Drawing. Application October 11, 1941, Serial No. 414,679

4 Claims. (Cl. 167—81)

This invention relates to parenteral solutions of 9-polyhydroxyalkyl-iso-alloxazins, especially 6,7-dimethyl-9-d-ribityl-iso-alloxazin (riboflavin).

The parenteral solutions of riboflavin heretofore available have been unsatisfactory for various reasons, inter alia, their low concentration or instability. The solubility of riboflavin in water is 125 micrograms per cc., and supersaturated solutions containing as high as 250 micrograms per cc. have been prepared; but the concentration of even this supersaturated solution is so low as to necessitate the administration of a parenterally-undesirable volume of solution. More concentrated solutions have been prepared by using 10% aqueous urea as the solvent, but such solutions are unstable, particularly when the solution is sterilized by heating (the urea breaking down in aqueous solution and liberating ammonia, which causes decomposition of the alkali-unstable riboflavin). More concentrated solutions have also been obtained by using aqueous N-methylacetamide (or other N-alkylated amides of lower fatty acids) as the solvent, but such solutions, too, are unstable.

It is the object of this invention to provide stable high-concentration parenteral solutions of 9-polyhydroxyalkyl-iso-alloxazins, especially riboflavin.

It has been found that the 9-polyhydroxyalkyl-iso-alloxazins are highly soluble in aqueous solutions of aliphatic-amidine acid-addition salts, especially in an aqueous solution of acetamidine hydrochloride, and that the resulting solutions are stable and—provided the aliphatic-amidine acid-addition salt is pharmacodynamically unobjectionable—suitable for parenteral administration. Thus, with a 20% aqueous solution of acetamidine hydrochloride as the solvent, riboflavin concentrations of 1900-2000 micrograms per cc. may be obtained, which solutions do not deposit riboflavin even when chilled to 8° C.; and with intermediate-concentration aqueous solutions of acetamidine hydrochloride as the solvent, e. g., 5% and 12–15%, solutions containing respectively 300-400 and about 1000 micrograms of riboflavin per cc. may be obtained.

The acid-addition salts of acetamidine are preferred for the purposes of this invention, being non-toxic and having no marked pharmacodynamic activity; and the hydrochlorides of the aliphatic-amidines are the preferred salts; but addition salts with other inorganic acids may be used, inter alia, the phosphates and sulfates.

The invention is applicable generally to solutions of 9-polyhydroxyalkyl-iso-alloxazins, inter alia, 6,7-dimethyl-9-1-arabityl-iso-alloxazin and 6,7-dimethyl-9-d-ribityl-iso-alloxazin (riboflavin).

The following example is illustrative of the invention: 150 g. acetamidine hydrochloride and 5 g. chlorobutanol are dissolved in sufficient water to make one liter of solution. Then 1 g. riboflavin is added, and the mixture is heated to 90° C. and held at that temperature for a short time (until the riboflavin is dissolved). The solution is then cooled to room temperature, filtered clear, packaged in ampules (either single-dose flame-sealed or multiple-dose rubber-capped), and rendered sterile (preferably by heating). All operations, and the filled and sterilized ampules, are preferably protected from light, as riboflavin is decomposed thereby.

The solution does not change in color or clarity on heat-sterilization, nor does it suffer any significant loss of riboflavin content under these conditions or on storage at slightly elevated temperature for a considerable time. Furthermore, the acidity of the solution (pH 2.75) is suitable for parenteral use and is not appreciably altered by the heat-sterilization. The chlorobutanol used is not an essential component of the solution, being included as a preservative when the solution is to be packaged in multiple-dose ampules.

The invention may be variously otherwise embodied within the scope of the appended claims.

I claim:

1. A parental solution essentially comprising a 9-polyhydroxyalkyl-iso-alloxazin, in a concentration higher than that obtainable in water alone, and an aqueous solution of an acetamidine acid-addition salt.

2. A parenteral solution essentially comprising a 9-polyhydroxyalkyl-iso-alloxazin, in a concentration higher than that obtainable in water alone, and an aqueous solution of acetamidine hydrochloride.

3. A parenteral solution essentially comprising riboflavin, in a concentration of more than 125 micrograms per cc., and an aqueous solution of acetamidine hydrochloride.

4. A heat-sterilized, ampuled parenteral solution essentially comprising riboflavin, in a concentration of more than 125 micrograms per cc., and an aqueous solution of acetamidine hydrochloride.

ALFRED E. JURIST.